No. 831,380.
PATENTED SEPT. 18, 1906.
A. W. SALOKAR.
FLY ESCAPE.
APPLICATION FILED AUG. 19, 1905.
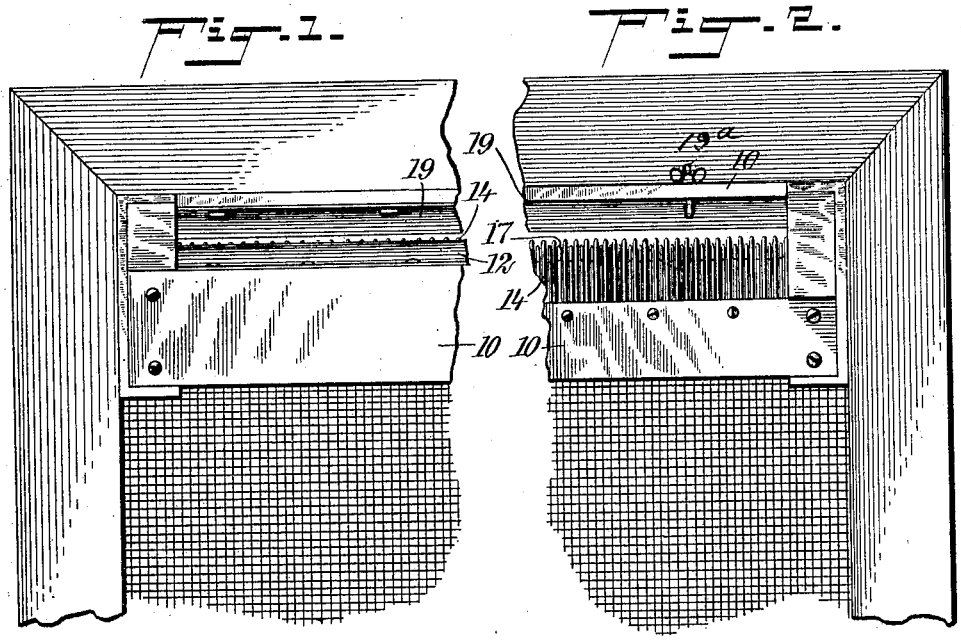
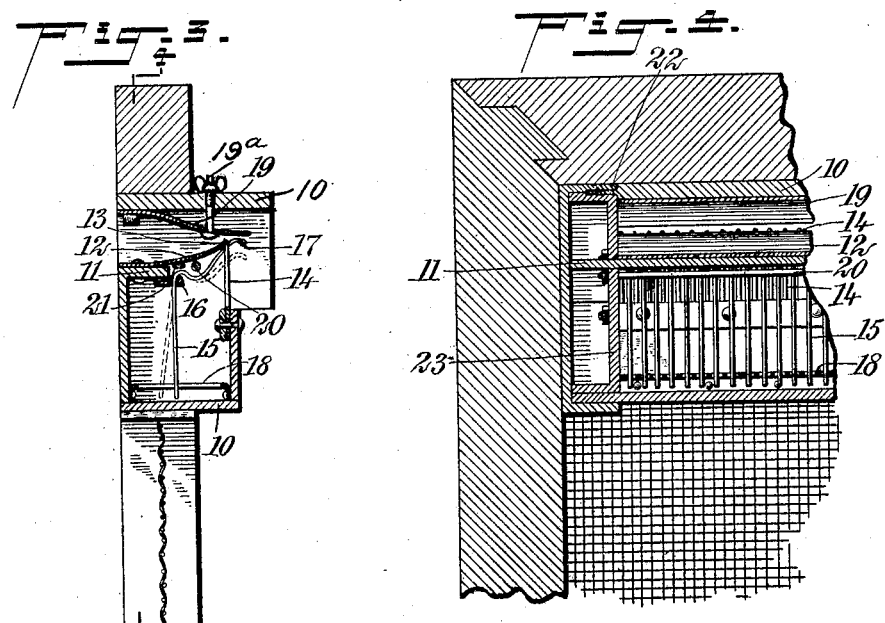
WITNESSES:
INVENTOR
Andrew W. Salokar
BY
ATTORNEYS

UNITED STATES PATENT OFFICE.

ANDREW WILLIAMS SALOKAR, OF LEWISTON, IDAHO.

FLY-ESCAPE.

No. 831,380. Specification of Letters Patent. Patented Sept. 18, 1906.

Application filed August 19, 1905. Serial No. 274,926.

*To all whom it may concern:*

Be it known that I, ANDREW WILLIAMS SALOKAR, a citizen of the United States, and a resident of Lewiston, in the county of Nez Perce and State of Idaho, have invented a new and Improved Fly-Escape, of which the following is a full, clear, and exact description.

My invention relates to a device adapted to permit flies readily to escape from a room or other inclosure and to prevent them from entering at the same point.

My invention may be attached to a window-screen or it may be applied to any opening independently of a screen.

Reference is to be had to the accompanying drawings, forming a part of this specification, in which similar characters of reference indicate corresponding parts in all the figures.

Figure 1 is an elevation of the inside of a screen provided with a device embodying the principle of my invention. Fig. 2 is an elevation of the outside of the same. Fig. 3 is a transverse sectional view, and Fig. 4 is a longitudinal sectional view on the line 4 4 of Fig. 3.

At the opening to which the invention is to be applied a casing 10 is provided, adapted to fit the walls of the opening sufficiently close to prevent the passage of flies or other insects for which the device is intended to be used. On the inside of the casing is placed a shelf 11, elevated from the bottom of the casing and forming a platform upon which the flies can find a resting-place. Above this platform is a plate 12, preferably formed of resilient material and constituting a continuation of the platform. This plate is bent slightly upward at its outer end 13, and a comb 14, preferably placed in vertical position, is mounted near the outside of the casing, so as to engage the lower outer surface of said projection 13, the latter extending over the comb 14.

Movably mounted in the spaces between the teeth of the comb are a series of bars 15, these bars being hung so as to freely swing about a support or pivot 16, which extends longitudinally with respect to the casing. In a normal position the ends 17 of these bars, which are curved, extend above the extremities of the teeth of the comb and enter the space formed immediately above the projection 13. At their lower ends the bars 15 extend through a second comb 18 and are guided thereby. Immediately above the ends of the comb 14 is placed a regulating-plate 19, which is preferably secured to the top of the casing. This plate may be adjusted so as to remain at any desired distance from the ends of the teeth of the comb, so as to permit any kind of insects to pass between these two elements. As shown in the drawings, the plate 19 is adjusted by means of a screw-bolt 19$^a$, secured to the said plate and passed out through an opening in the top of the casing 10 and provided with a thumb-nut 19$^b$. (See Figs. 2 and 3.) Said plate extends beyond the ends 17 of the bars 15.

In their normal position the bars 15 will be held in such a manner that their projections 17 will enter the space between the plates 12 and 19 and prevent the entrance of insects from without. When insects attempt to force their way in, they will force the bars back into engagement with a longitudinal pin 20 in the casing, and further progress will be stopped. The weight of the lower ends of the bars is what normally holds them in their upper position, and when insects attempt to crawl out through the space between the plates 12 and 19 they will stop on the bars, which being light and mounted to easily swing will yield and permit the insects to readily emerge from the space between the plates.

I have shown several other features of construction—as, for example, a longitudinal bar 21 for supporting the plate 12, a joint 22 between the top of the casing 10 and the ends thereof, and a flanged metallic end piece 23 for the casing. It will be readily understood, however, that the device may be constructed of any desired materials which are suitable for the purpose intended.

Having thus described my invention, I claim as new and desire to secure by Letters Patent—

1. In a device of the character described, the combination of a plate, a series of pivoted bars, their upper ends extending slightly above the edge of said plate, said bars having means for normally and yieldingly holding them in said position, and a regulating-plate located above the ends of said bars.

2. In a device of the character described, the combination of a plate, a series of pivoted bars, their upper ends extending slightly above the edge of said plate, said bars having means for normally and yieldingly holding them in said position, a regulating-plate located above the ends of said bars, and means for guiding said bars located adjacent to the edge of the first-named plate, said bars being adapted to project beyond said edge, and in their normal position located adjacent to the surface of the second plate but when moved therefrom permitting a space sufficient for the passage of a fly between the second plate and the edges of the bars.

3. The combination of a casing having a platform, a plate extending from and forming a continuation of the platform, a plate mounted above the first plate, and a series of bars pivoted below said first-named plate and having projections normally extending in front of the space between said plates, said bars being mounted to readily yield to permit the passage of an insect through the space in one direction.

4. The combination of a pair of plates spaced apart, a series of bars normally mounted so as to extend into the space between the plates, said bars being mounted to yield outwardly away from said space, and means for preventing the bars from moving beyond a certain point toward said space.

5. The combination of a pair of plates converging toward each other and having a space between their outer ends, a comb mounted below the lower plate, a second comb mounted adjacent to the first-mentioned comb, and a series of movably-mounted bars having portions extending between the teeth of said combs and guided thereby, said bars normally extending in front of the space between said plates.

In testimony whereof I have signed my name to this specification in the presence of two subscribing witnesses.

ANDREW WILLIAMS SALOKAR.

Witnesses:
 J. D. McCONKEY,
 R. S. ANDERSON.